(12) United States Patent
Park et al.

(10) Patent No.: US 11,675,394 B2
(45) Date of Patent: Jun. 13, 2023

(54) DISPLAY DEVICE

(71) Applicant: Samsung Display Co., Ltd., Yongin-si (KR)

(72) Inventors: Changmin Park, Gwangmyeong-si (KR); Kyungmin Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 1178 days.

(21) Appl. No.: 16/233,654

(22) Filed: Dec. 27, 2018

(65) Prior Publication Data

US 2019/0204879 A1 Jul. 4, 2019

(30) Foreign Application Priority Data

Dec. 28, 2017 (KR) .................. 10-2017-0181848

(51) Int. Cl.
*G06F 1/16* (2006.01)
*G09F 9/30* (2006.01)

(52) U.S. Cl.
CPC .......... *G06F 1/1681* (2013.01); *G06F 1/1652* (2013.01); *G09F 9/301* (2013.01)

(58) Field of Classification Search
CPC combination set(s) only.
See application file for complete search history.

(56) References Cited

U.S. PATENT DOCUMENTS

| | | | |
|---|---|---|---|
| 8,369,075 B2 | 2/2013 | Huang | |
| 9,572,267 B2 | 2/2017 | Cho | |
| 9,939,847 B2 | 4/2018 | Kee et al. | |
| 2008/0079880 A1 | 4/2008 | Mochizuki et al. | |
| 2016/0338219 A1* | 11/2016 | Seo | G02F 1/133308 |
| 2017/0061836 A1* | 3/2017 | Kim | G06F 1/1626 |
| 2018/0136696 A1* | 5/2018 | Chen | H04M 1/0216 |
| 2018/0177046 A1* | 6/2018 | Wald | H05K 5/0017 |
| 2018/0314299 A1* | 11/2018 | Xia | G06F 1/1681 |
| 2019/0014674 A1* | 1/2019 | Lin | H05K 5/0017 |
| 2019/0025886 A1 | 1/2019 | Ryu et al. | |
| 2019/0196541 A1* | 6/2019 | O'Neil | G06F 1/1681 |
| 2019/0333425 A1* | 10/2019 | Yasuda | H01L 27/1266 |

FOREIGN PATENT DOCUMENTS

| | | |
|---|---|---|
| JP | 2015-75760 | 4/2015 |
| KR | 10-0867608 | 11/2008 |
| KR | 10-2009-0051251 | 5/2009 |
| KR | 10-2014-0142004 | 12/2014 |
| KR | 10-2016-0097034 | 8/2016 |
| KR | 10-2016-0117799 | 10/2016 |
| KR | 10-2016-0141254 | 12/2016 |
| WO | 2016/0125985 | 8/2016 |

OTHER PUBLICATIONS

Cano, Roberto J., "composite Properties of Polyimide Resins Made From "salt-Like" solution Precursors", 1998, pp. 1-13 (Year: 1998).*

* cited by examiner

*Primary Examiner* — William Boddie
*Assistant Examiner* — Alecia D English
(74) *Attorney, Agent, or Firm* — H.C. Park & Associates, PLC

(57) ABSTRACT

A display device includes: a display panel; a multi-joint mechanism configured to provide foldability and support to the display panel; and an elastic member disposed between the multi-joint mechanism and the display panel, wherein a distance between an upper surface of the multi-joint mechanism and a lower surface of the display panel varies depending on the position of the display panel.

11 Claims, 13 Drawing Sheets

DISPLAY DEVICE

CROSS-REFERENCE TO RELATED APPLICATION

This application claims priority from and the benefit of Korean Patent Application No. 10-2017-0181848, filed on Dec. 28, 2017, which is hereby incorporated by reference for all purposes as if fully set forth herein.

BACKGROUND

Field

Exemplary embodiments of the present invention relate generally to a display device, and more particularly, to a flexible display device in which a hinge portion is coated to improve unevenness at a folding portion.

Discussion of the Background

In general, flexible display devices (e.g., foldable display devices) include a multi-joint mechanism or a multi-joint element, in the form of a projection, which is disposed at a folding portion of the display device to support a display panel, so that the display device may be bent freely. When the display device is folded or unfolded, a distance between the projection shapes of the multi-joint mechanism is changed. That is, the distance between the projection shapes of the multi-joint mechanism is narrowed when the display device is folded, and the distance between the projection shapes returns to the original state when the display device is unfolded, thus substantially preventing damages to the display device.

However, due to a dimensional error or assembly tolerance in manufacture of the multi-joint mechanism, unevenness may be generated on a surface thereof to be attached to the flexible display device, which leads to deformation of the folding portion of the flexible display device.

Since these unevenness at the hinge portion is visually recognized, a planarizing technique to reduce such unevenness of the surface to be attached to the display device is required.

The above information disclosed in this Background section is only for understanding of the background of the inventive concepts, and, therefore, it may contain information that does not constitute prior art.

SUMMARY

Devices constructed and methods according to exemplary embodiments of the invention may be directed to a display device, e.g., a flexible display device, in which unevenness of a folding portion is improved by slit coating the folding portion of the display device.

According to an exemplary embodiment, a display device includes: a display device including: a display panel; a multi-joint mechanism configured to provide foldability and support to the display panel; and an elastic member disposed between the multi-joint mechanism and the display panel, wherein a distance between an upper surface of the multi-joint mechanism and a lower surface of the display panel varies depending on the position of the display panel.

An upper surface of the elastic member may have a flatness substantially equal to a flatness of the lower surface of the display panel.

A thickness of the elastic member may vary depending on the position of the display panel.

The thickness of the elastic member may be about 10 μm or more and about 50 μm or less depending on the position of the display panel.

The elastic member may include a coating layer formed by slit coating.

The coating layer may include: a first coating layer disposed on the multi-joint mechanism; and a second coating layer disposed on the first coating layer.

The first coating layer may have a first viscosity higher than a second viscosity of the second coating layer.

The first coating layer may have a first viscosity in a range from about 50000 cP to about 100000 cP, and the second coating layer may have a second viscosity in a range from greater than 0 cP to about 50000 cP.

Each of a thickness of the first coating layer and a thickness of the second coating layer may be in a range from about 10 μm to about 50 μm depending on the position of the display panel.

The elastic member may include at least one of silicon, rubber, and plastic.

The display device may further include a PSA sheet disposed between the multi-joint mechanism and the elastic member.

The display device may further include an adhesive disposed between the display panel and the elastic member.

According to an exemplary embodiment, a method of manufacturing a display device, the method including: injecting an elastic member coating solution into a slit coater; coating a surface of a multi-joint mechanism with the elastic member coating solution through a slit of the slit coater; and disposing a display panel on an elastic member coating layer formed on an upper surface of the multi-joint mechanism.

An upper surface of the coating layer may have a flatness substantially equal to a flatness of a lower surface of the display panel.

A thickness of the coating layer may vary depending on the position of the display panel.

The thickness of the coating layer is about 10 μm or more and about 50 μm or less depending on the position of the display panel.

The coating layer may include: a first coating layer disposed on the multi-joint mechanism; and a second coating layer disposed on the first coating layer.

The first coating layer may have a first viscosity higher than a second viscosity of the second coating layer.

The first coating layer may have a first viscosity in a range from about 50000 cP to about 100000 cP, and the second coating layer may have a second viscosity in a range from greater than 0 cP to about 50000 cP.

Each of a thickness of the first coating layer and a thickness of the second coating layer may be in a range from about 10 μm to about 50 μm depending on the position of the display panel.

The elastic member may include at least one of silicon, rubber, and plastic.

The method of manufacturing a display device may further include disposing a PSA sheet between the multi-joint mechanism and the elastic member coating layer.

The method of manufacturing a display device may further include disposing an adhesive between the display panel and the elastic member coating layer.

According to an exemplary embodiment, a method of manufacturing a display panel, the method including: inserting a multi-joint mechanism between an upper mold portion and a lower mold portion, an inner upper surface of the upper mold portion being mirror-finished; injecting a resin to a surface of the multi-joint mechanism through an injection port between the upper mold portion and the multi-joint mechanism; and disposing a display panel on an upper surface of the multi-joint mechanism.

According to an exemplary embodiment of the present invention, a method of manufacturing a display device includes: injecting an elastic member coating solution into a slit coater; coating a surface of a multi-joint mechanism with the elastic member coating solution through a slit of the slit coater; and disposing a display panel on an elastic member coating layer formed on an upper surface of the multi-joint mechanism.

An upper surface of the coating layer may have a flatness substantially equal to a flatness of a lower surface of the display panel.

A thickness of the coating layer may vary depending on the position of the display panel.

The thickness of the coating layer may be about 10 μm or more and about 50 μm or less depending on the position of the display panel.

The coating layer may include a first coating layer on the multi-joint mechanism, and a second coating layer on the first coating layer.

The first coating layer may have a viscosity higher than a viscosity of the second coating layer.

The first coating layer may have a viscosity in a range from about 50000 cP to about 100000 cP, and the second coating layer may have a viscosity in a range from about 0 cP to about 50000 cP.

Each of a thickness of the first coating layer and a thickness of the second coating layer may be in a range from about 10 μm to about 50 μm depending on the position of the display panel.

The elastic member may include at least one of silicon, rubber, and plastic.

The method may further include disposing a PSA sheet between the multi-joint mechanism and the elastic member coating layer.

The method may further include disposing an adhesive between the display panel and the elastic member coating layer.

According to an exemplary embodiment of the present invention, a method of manufacturing a display panel includes: inserting a multi-joint mechanism between an upper mold portion and a lower mold portion, an inner upper surface of the upper mold portion being mirror-finished; injecting a resin to a surface of the multi-joint mechanism through an injection port between the upper mold portion and the multi-joint mechanism; and disposing a display panel on an upper surface of the multi-joint mechanism.

Additional features of the inventive concepts will be set forth in the description which follows, and in part will be apparent from the description, or may be learned by practice of the inventive concepts. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
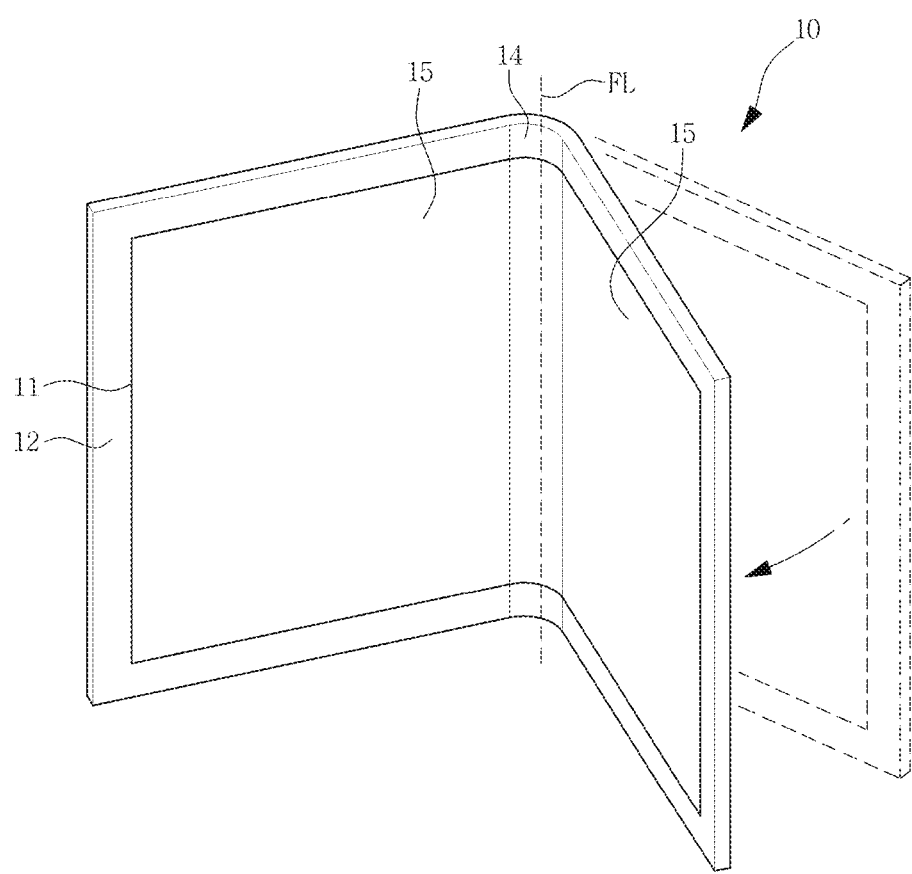
FIG. 1 is a perspective view of a foldable display device, according to exemplary embodiments.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
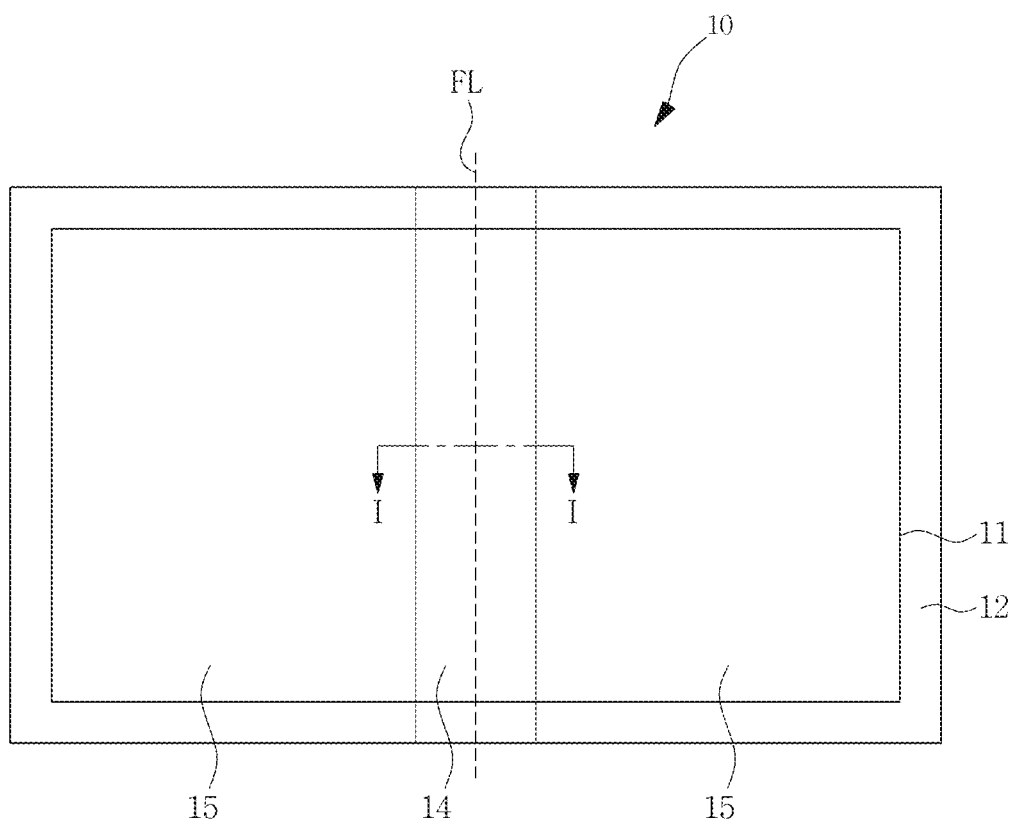
FIG. 2 is a plan view of the foldable display device, according to exemplary embodiments.

FIG. 1 is a perspective view of a foldable display device, and FIG. 2 is a plan view of the foldable display device, according to exemplary embodiments.

Referring to FIGS. 1 and 2, a foldable display device 10 includes a display area 11 on which images are displayed and a non-display area 12 disposed on the periphery of the display area 11. The foldable display device 10 may be folded with respect to a folding line FL. The folding line FL is not an actual configuration of the foldable display device 10, but is a virtual line provided for convenience of explanation.

Although it is described in FIGS. 1 and 2 that the foldable display device 10 is folded symmetrically with respect to the folding line FL, the exemplary embodiments are not limited thereto. In an exemplary embodiment, the foldable display device 10 may be folded unsymmetrically with respect to the folding line FL. In addition, the foldable display device 10 may include two or more folding lines FL.

In addition, the foldable display device 10 may include a folding portion 14 which is foldable with respect to the folding line FL and a flat portion 15 which is not foldable.

Figure 3:
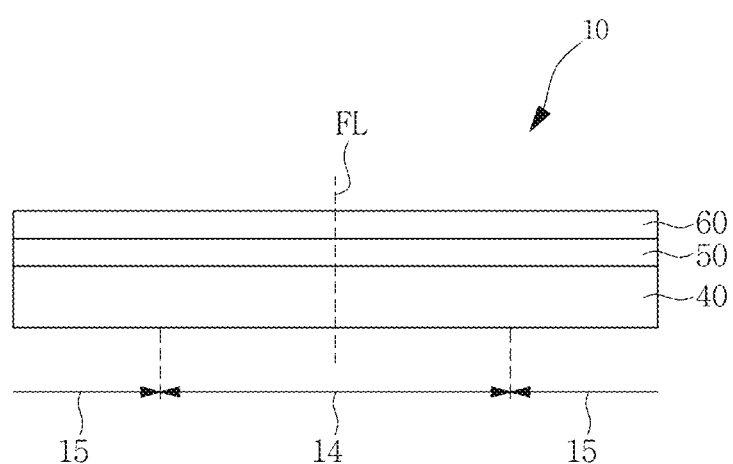
FIG. 3 is a cross-section view taken along sectional line I-I of FIG. 2, according to exemplary embodiments.

FIG. 3 is a cross-section view taken along sectional line I-I of FIG. 2. Referring to FIG. 3, the foldable display device 10 according to an exemplary embodiment of the present invention includes a display panel 40, a touch panel 50 on the display panel 40, and a cover window 60 on the touch panel 50.

Each of the display panel 40, the touch panel 50, and the cover window 60 includes a folding portion 14 that is foldable with respect to the folding line FL and a flat portion 15 that is not foldable.

The display panel 40 displays images. The kind of the display panel is not particularly limited. Examples of the display panel may include various display panels such as an organic light emitting diode (OLED) display panel, a liquid crystal display (LCD) panel, a plasma display panel (PDP), or an electrophoretic display panel.

The touch panel 50 is disposed between the display panel 40 and the cover window 60 and receives a touch signal provided from the outside of the cover window 60. The touch panel 50 converts the touch signal into an electric signal and provides it to the display panel 40.

Figure 4:
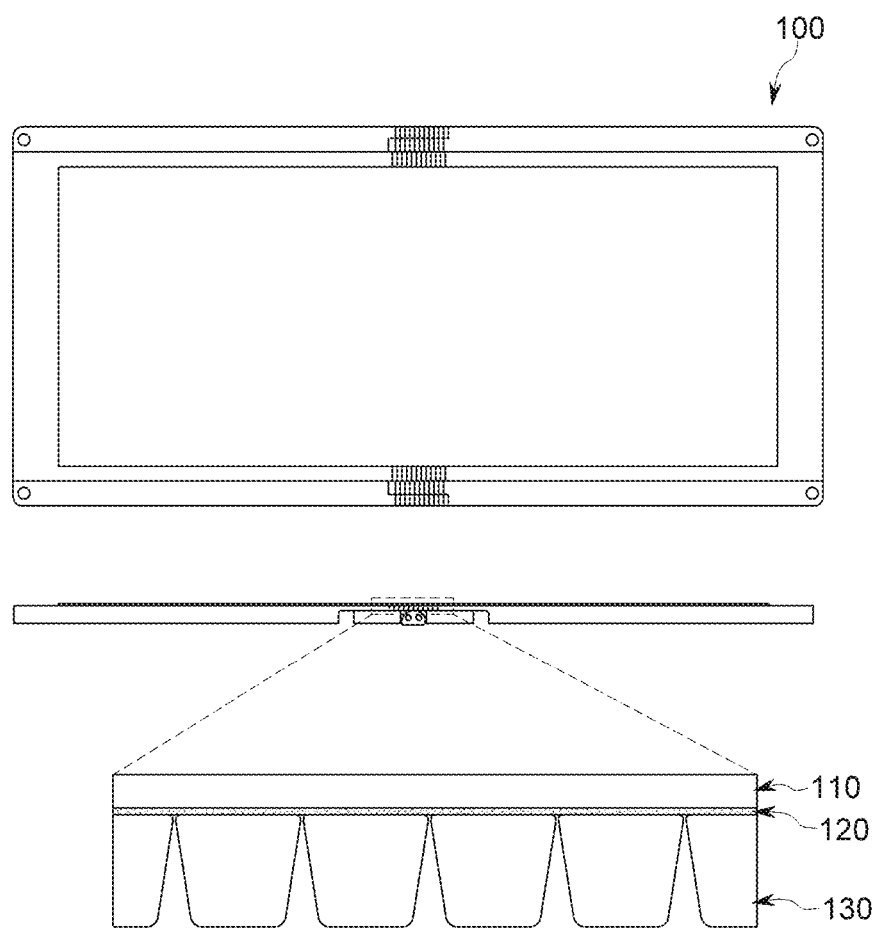
FIG. 4 is a schematic view of a foldable display device, according to exemplary embodiments.
Figure 5:
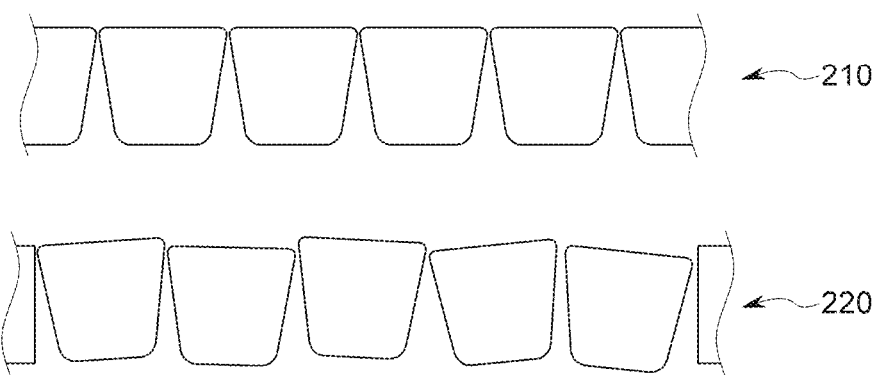
FIG. 5 is a view schematic view of a multi-joint mechanism attached to a foldable display device, according to exemplary embodiments.

FIG. 4 is a schematic view of a fordable display device 100, and FIG. 5 is a view schematic view of a multi-joint mechanism attached to the fordable display device 100, according to the exemplary embodiments. Referring to FIGS. 4 and 5, the foldable display device 100 includes a display panel 110, an adhesive 120, and multiple joints 130. The multiple joints 130 are disposed at a hinge portion of the display device. The multiple joints 130 may each have a projection shape. The multiple joints 130 serve to support the display panel 110, bend the display panel 110, and reduce a distance between the multiple joints each having a projection shape, thus substantially preventing deformation of the display panel 110 and allowing the display panel 110 to be folded 180 degrees.

An attachment surface of a multi-joint mechanism is designed to have a flat surface, as illustrated in a design data 210. However, when the multi-joint mechanism is manufactured and produced in practice, flattening defects of the attachment surface occurs due to manufacturing errors of the multi-joint mechanism and the dimension tolerance of the multi-joint mechanism, as an actual multi-joint mechanism 220.

Such unevenness caused by flattening defects may be recognized even in a curved portion of the display panel 110 with which the unevenness is in contact. Further, even through a film is attached to prevent the unevenness, it is difficult to reduce the occurrence of the unevenness. Accordingly, a planarizing technique is required to reduce the unevenness of the multiple joints 130.

Figure 6A:
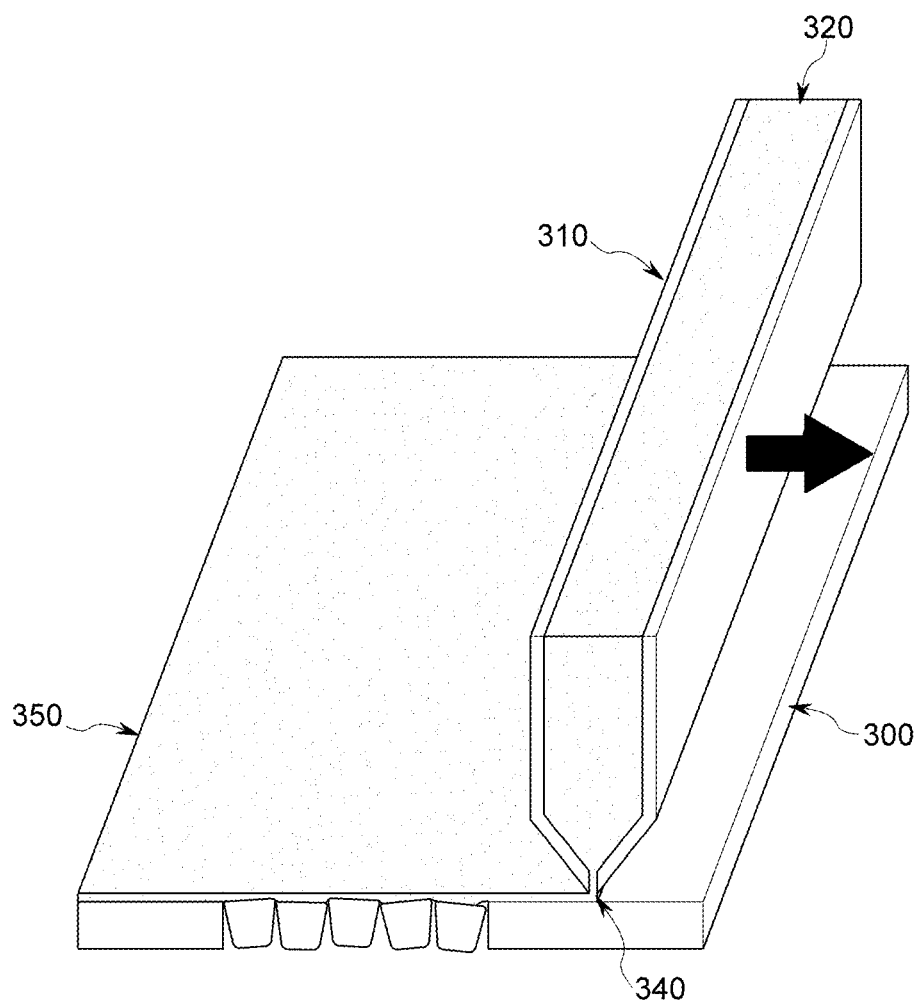
FIGS. 6A and 6B illustrate a method of slit coating a multi-joint mechanism, according to exemplary embodiments.
Figure 6B:
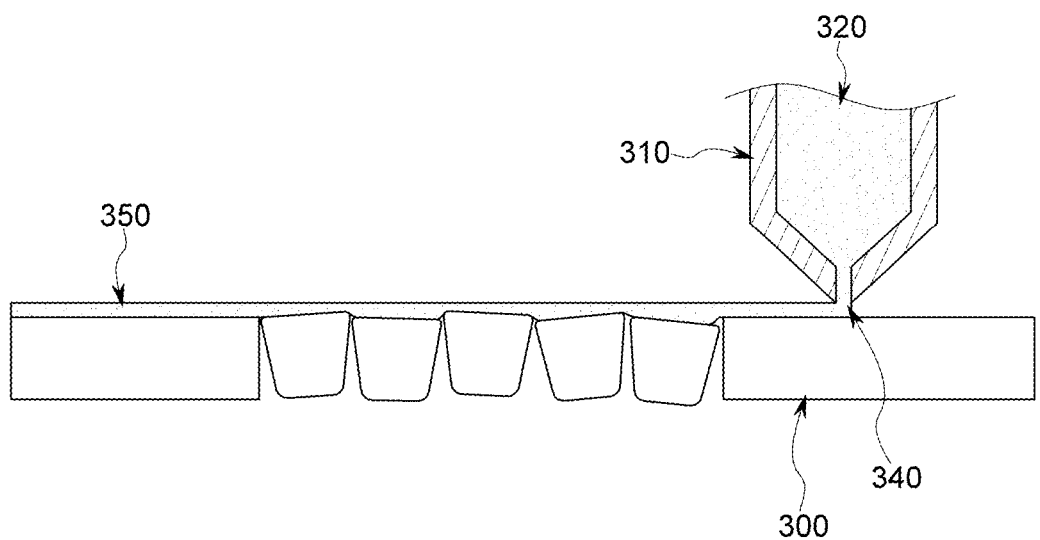

FIGS. 6A and 6B illustrate a method of slit-coating a multi-joint mechanism according to the exemplary embodiments. Referring to FIGS. 6A and 6B, an elastic member coating solution 320 is injected into a slit coater 310, and the slit coater 310 allows the elastic member coating solution 320 to flow on an upper surface of the multiple joints 300 through a slit 340.

The elastic member coating solution 320 flowing through the slit 340 forms a thin coating layer 350, and thus the unevenness of the multiple joints 300 is not recognized even though the sizes of the multiple joints 300 are not uniform. An upper surface of the coated elastic member and a lower surface of the display panel mounted on the upper surface of the elastic member may have a substantially same flatness. The flatness may be about 100 μm or less. That is, a height of the unevenness of the multiple joints 300 may be about 100 μm or less. Even when the elastic member coating layer 350 is formed, a distance between an upper surface of the multiple joints 300 and a lower surface of the display panel may vary depending on the position of the display panel, due to the unevenness of the multiple joints 300. Accordingly, a thickness of the coated elastic member may vary depending on the position of the display panel. For example, a distance between the upper surface of the multiple joints 300 and the lower surface of the display panel at an upper end portion of the display panel may differ from a distance between the upper surface of the multiple joints 300 and the lower surface of the display panel at a lower end portion of the display panel. This means that the thickness of the coated elastic member at the upper end portion of the display panel may differ from the thickness of the coated elastic member at the lower end portion of the display panel.

The elastic member coating solution 320 is applied over an entire area of an upper surface (i.e., the attachment surface) of the multiple joints 300 to be attached to the display panel, such that the attachment surface may be planarized. After the coating the elastic member coating solution 320 through the slit 340, the elastic member coating solution 320 may be cured to have elasticity. When the elastic member coating solution 320 is cured, the coating layer 350 has high elasticity, high elongation, and high durability, and thus not only the surface to be attached to the display panel is planarized, but also the coating layer 350 absorbs impacts of the display device to substantially prevent breakage of the display panel. The display panel is disposed on the elastic member coating layer 350, and the display device is manufactured.

Examples of the elastic member included in the elastic member coating solution 320 may include a material having elasticity such as silicone, rubber, or plastic. When cured, the coating layer has a thickness in a range from about 10 μm to about 50 μm. In addition, the thickness of the elastic member may be in a range from about 10 μm to about 50 μm depending on the position of the display panel.

When the coating the elastic member coating solution 320 through the slit 340 is completed, a process of planarizing the surface to be attached to the display panel may be performed using a planarizing bar. The planarizing bar removes the unevenness of the coating layer 350 that has been generated due to the coating through the slit 340 to planarize the surface to be attached to the display panel.

Figure 7A:
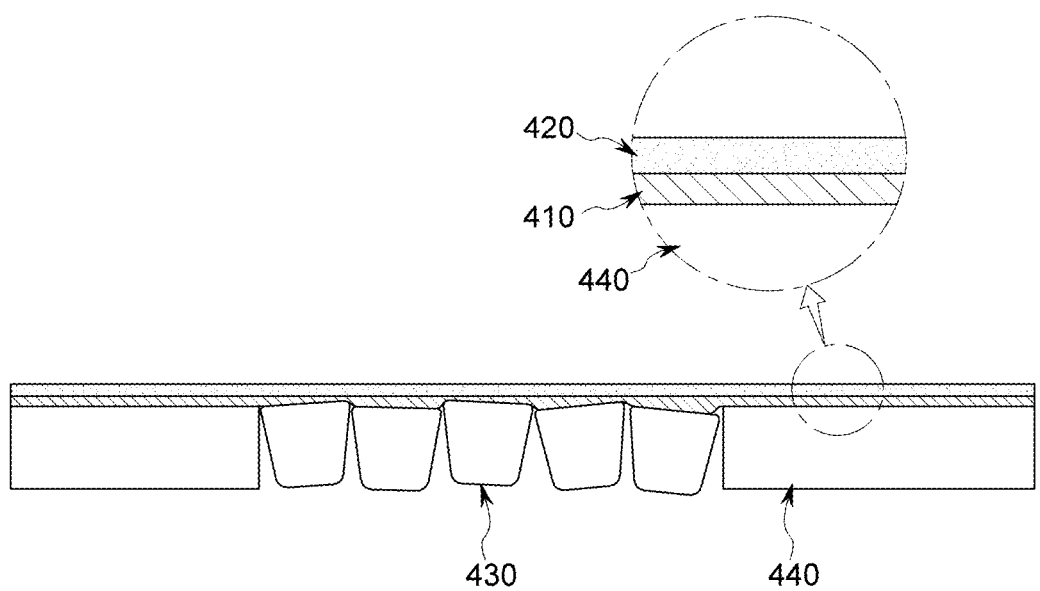
FIGS. 7A and 7B illustrate a method of slit coating a multi-joint mechanism, according to exemplary embodiments.
Figure 7B:
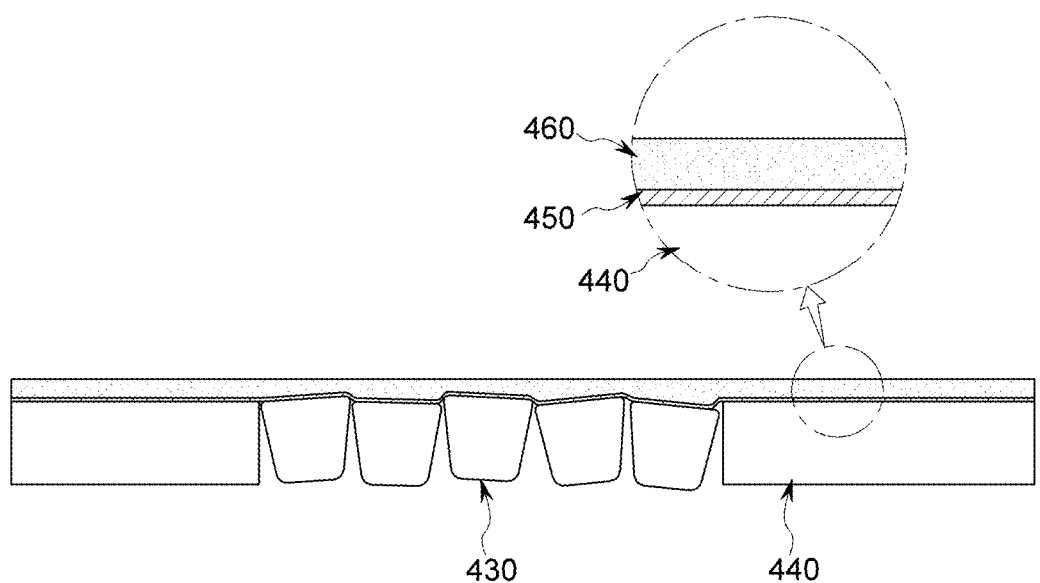

FIGS. 7A and 7B illustrate a method of slit coating a multi-joint mechanism, according to the exemplary embodiments.

FIG. 7A is a view illustrating a planarizing multi-coating method according to an exemplary embodiment of the present invention. A primary coating is performed on multiple joints 430 and a mechanism 440, using a high viscosity coating solution 410, to form a first coating layer. Thereafter, a secondary coating is performed thereon using a low viscosity coating solution 420 to form a second coating layer. Since the primary coating and the secondary coating are performed using the high viscosity coating solution and the low viscosity coating solution, the coating solution is substantially prevented from flowing out into a space between the multiple joints. When the coating solution is directly coated on the multiple joints 430, the coating solution may flow out through the multiple joints. In order to substantially prevent this, coating with the high viscosity coating solution 410 is performed first. That is, the high viscosity coating solution 410 used in the primary coating may substantially prevent the coating solution from flowing out, and the low viscosity coating solution 420 used in the secondary coating may planarize the surface to be attached to the display panel.

The low viscosity coating solution 420 may have a viscosity in a range from greater than 0 cP to about 50000 cP, and the high viscosity coating solution 410 may have a viscosity in a range from about 50000 cP to about 100000 cP. Herein, "cP" represents the unit of viscosity, i.e., centipoise. In an exemplary embodiment, the high viscosity coating solution 410 may be cured to have a thickness in a range from about 10 μm to about 50 μm, and the low viscosity coating solution 420 may be cured to have a thickness in a range from about 10 μm to about 50 μm. In addition, each thickness of the first coating layer and the second coating layer may be in a range from about 10 μm to about 50 μm depending on the position of the display panel.

The coating may be performed through slit coating, and after the slit coating is performed, a process of planarizing the surface to be attached to the display panel may be performed using a planarizing bar. The planarizing bar removes or reduce unevenness of the coating layer which is generated by slit coating to planarize the surface to be attached to the display panel.

FIG. 7B is a view illustrating a planarizing multi-coating method according to an exemplary embodiment of the present invention. According to the present embodiment, a pressure sensitive adhesive ("PSA") sheet 450 including an inorganic material is attached on the multiple joints 430 and the mechanism 440. The PSA sheet may include acrylic or silicone, or a combination thereof, and may have a thickness of about 50 µm or less. Thereafter, an elastic member coating solution 460 is coated on the PSA sheet 450. The PSA of a thin film may be primarily attached thereto, thus substantially preventing the coating solution from flowing out through the multiple joints 430, and then the surface to be attached to the display panel may be planarized by slit coating. The elastic member coating solution 460 may be cured to have a thickness in a range from about 10 µm to about 50 µm.

After the slit coating, a process of planarizing the surface to be attached to the display panel may be performed using a planarizing bar. The planarizing bar removes the unevenness of the coating layer that is generated due to the slit coating to planarize the surface to be attached to the display panel.

Figure 8:
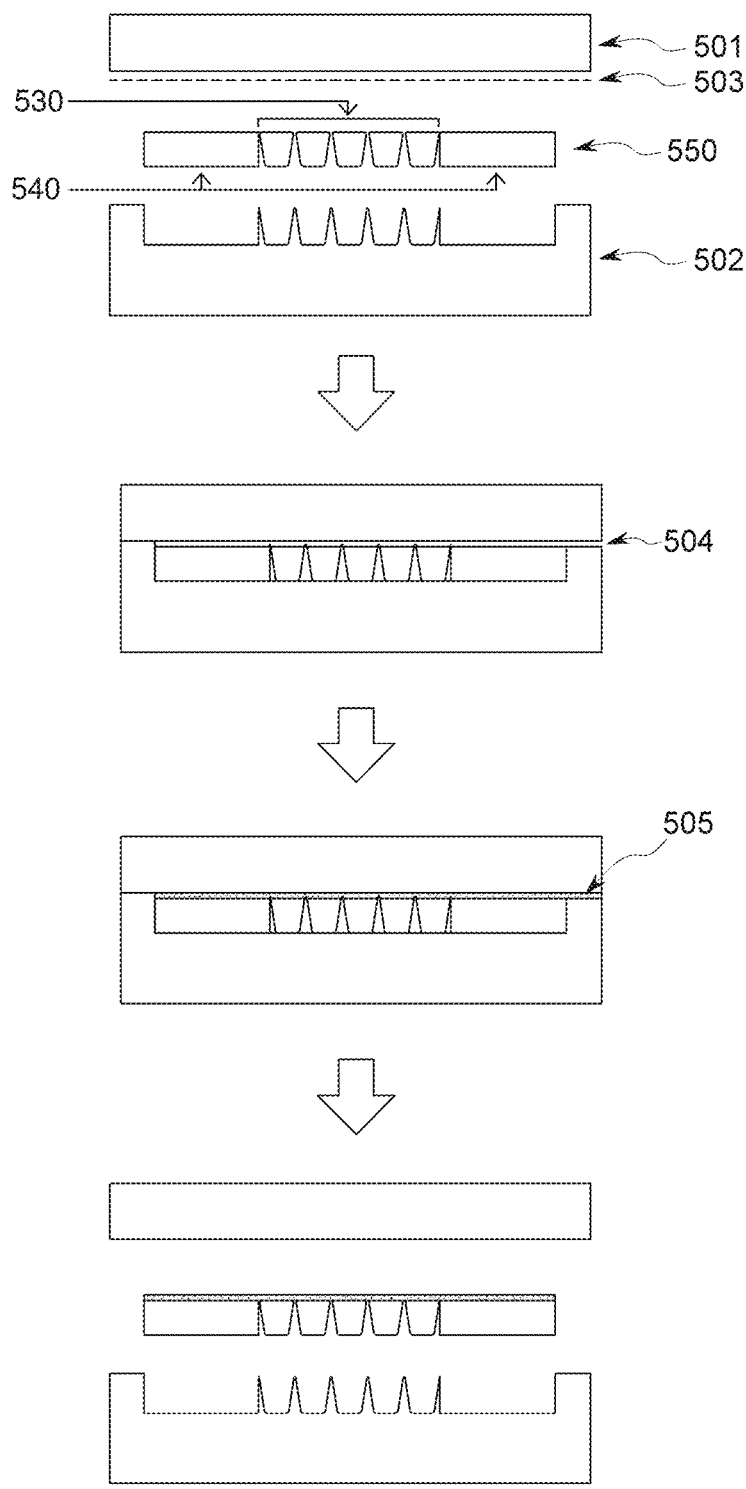
FIG. 8 illustrates a planarizing method using a mold, according to exemplary embodiments.

FIG. 8 illustrates a planarizing method using a mold according to the exemplary embodiments.

Referring to FIG. 8, the mold includes an upper mold portion 501 and a lower mold portion 502. A multi-joint mechanism 550 including multiple joints 530 and a mechanism 540 is placed between the upper mold portion 501 and a lower mold portion 502. After an inner upper surface 503 is processed, the multi-joint mechanism 550 is inserted between the molds. By processing the inner upper surface 503, a resin 505 may be easily attached to a surface of the multi-joint mechanism 550. The inner upper surface 503 may be processed by a mirror-surface treatment method, for example.

When the multi-joint mechanism 550 is inserted to the mold, an injection port 504 for injecting an elastic member such as the resin 505 is defined, and the resin 505 is injected along the injection port 504. Thereafter, the upper mold portion 501 and the lower mold portion 502 are separated from each other, and the multi-joint mechanism 550 to which the resin 505 is attached is taken out. A display panel is disposed on an upper surface of the multi-joint mechanism, and thus the display device is manufactured.

In the exemplary embodiment illustrated in FIG. 8, through a method of bonding the multi-joint mechanism with a resin material by a molding technique and planarizing the multi-joint mechanism, a surface of the upper mold portion 501 is mirror-finished to perform surface treatment of the multiple joints 530 and the mechanism 540. Accordingly, an adhesive force between the surface of the multi-joint mechanism and the resin may be improved. In addition, coating of an elastic member such as a resin may be performed through compression molding.

Figure 9A:
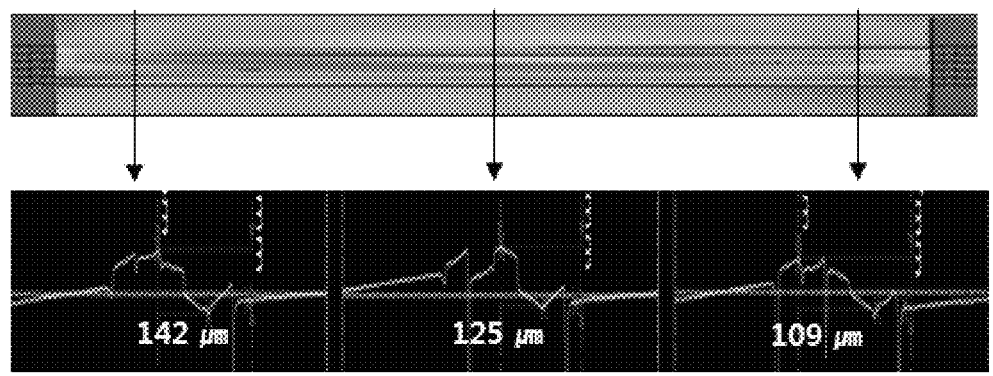
FIGS. 9A and 9B are diagrams of the flatness of the foldable display device before and after applying a flatness-improved sample, respectively.
Figure 9B:
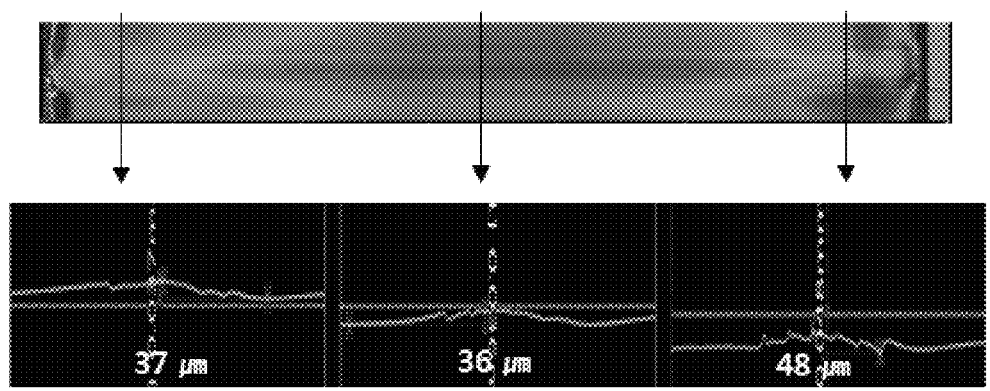

FIGS. 9A and 9B are diagrams of the flatness of the foldable display device before and after applying a flatness-improved sample, respectively.

Referring to FIGS. 9A and 9B, a maximum height of the unevenness in the direction of an arrow is about 142 µm, about 125 µm, and about 109 µm before applying the flatness-improved sample. However, after the flatness-improved sample is applied, the maximum height of the unevenness is about 37 µm, about 36 µm, and about 48 µm, showing improvement by about 70%.

Figure 10:
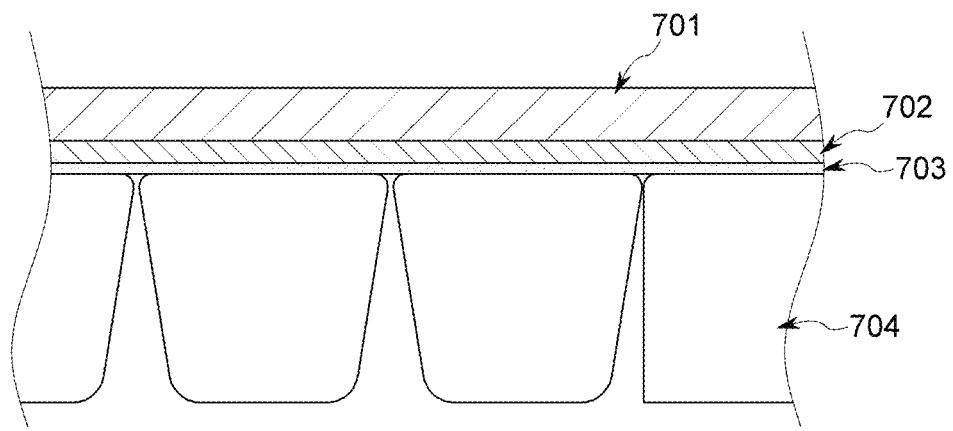
FIG. 10 illustrates a foldable display device before applying a flatness-improved sample, according to exemplary embodiments.

FIG. 10 illustrates a foldable display device before applying a flatness-improved sample, according to the exemplary embodiments.

Referring to FIG. 10, the foldable display device before applying the flatness-improved sample includes a display panel 701, a cushion 702, an adhesive 703, and a multi-joint mechanism 704. The cushion 702 absorbs impacts generated from the multi-joint mechanism 704.

Figure 11:
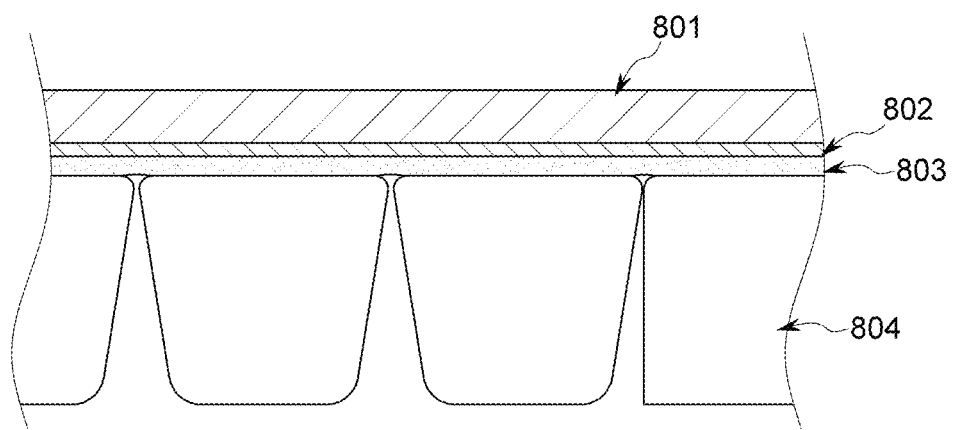
FIG. 11 illustrates a foldable display device after applying a flatness-improved sample, according to exemplary embodiments.

FIG. 11 illustrates a foldable display device after applying the flatness-improved sample, according to the exemplary embodiments. Referring to FIG. 11, the foldable display device applied with the flatness-improved sample includes a display panel 801, an adhesive 802, an elastic member 803, and a multi-joint mechanism 804. When the foldable display device is manufactured by using the elastic member 803, even though unevenness is generated because of partial deformation of the multi-joint mechanism 804 or manufacturing errors, the surface to be attached to the display panel 801 may be improved to be uniform through a planarizing process, and the foldable display device may be manufactured without the cushion for absorbing impacts. The elastic member 803 is attached to the multi-joint mechanism 804 by a method of slit coating. The elastic member 803 may include a material having elasticity such as silicone, rubber, or plastic.

As described above, the method of improving the unevenness of the hinge portion of the foldable display device according to an exemplary embodiment of the present invention may improve deformation of the foldable display device by removing the unevenness of the joint multi-joint mechanism, and may also absorb impacts applied to the display device.

As set forth hereinabove, according to one or more exemplary embodiments, the foldable display device in which the folding portion is slit-coated may improve uniformity of an attachment surface of the display device and enhance the impact resistance performance thereof.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a display panel that includes a hinge area;
    a multi-joint mechanism configured to provide foldability and support to the display panel, the multi-joint mechanism including uneven multiple joints such that a top surface of the multiple joints are not aligned with each other with respect to a cross-sectional view of the mutli-joint mechanism; and
    an elastic member disposed between the multi-joint mechanism and the display panel,
    wherein a distance between an upper surface of the multi-joint mechanism and a lower surface of the display panel varies depending on a position across the hinge area, the varying being based on an amount of folding being made at the hinge area of the display panel, and wherein a thickness of the elastic member varies depending on the position across the hinge area, and based in part on the non-aligned top surfaces of the multi-joint mechanism such that at least one of the multiple joints has a top surface closer to the lower surface of the display panel than a top surface of another one of the multiple joints, the varying being based on an amount of folding being made at the hinge area of the display panel.

2. The display device of claim 1, wherein an upper surface of the elastic member has a flatness substantially equal to a flatness of the lower surface of the display panel.

3. The display device of claim 1, wherein the thickness of the elastic member is about 10 μm or more and about 50 μm or less depending on the position across the hinge area of the display pane and the unevenness of the respective top surfaces of the multi-joints making up the multi-joint mechanism.

4. The display device of claim 1, wherein the elastic member comprises a coating layer formed by slit coating.

5. The display device of claim 4, wherein the coating layer comprises: a first coating layer disposed on the multi-joint mechanism; and a second coating layer disposed on the first coating layer.

6. The display device of claim 5, wherein the first coating layer has a first viscosity higher than a second viscosity of the second coating layer.

7. The display device of claim 5, wherein the first coating layer has a first viscosity in a range from about 50000 cP to about 100000 cP, and the second coating layer has a second viscosity in a range from greater than about 0 cP to about 50000 cP.

8. The display device of claim 5, wherein each of a thickness of the first coating layer and a thickness of the second coating layer is in a range from about 10 μm to about 50 μm depending on the position of the display panel.

9. The display device of claim 1, wherein the elastic member comprises at least one of silicon, rubber, and plastic.

10. The display device of claim 1, further comprising a PSA sheet disposed between the multi-joint mechanism and the elastic member, wherein the PSA sheet is operative to prevent coating solution of the elastic member from flowing out of the display device through the multi-joints of the multi-joint mechanism.

11. The display device of claim 1, further comprising an adhesive disposed between the display panel and the elastic member.

* * * * *